(12) United States Patent
Tu

(10) Patent No.: US 12,071,917 B2
(45) Date of Patent: Aug. 27, 2024

(54) HIGH-PRESSURE GAS COMPRESSION-IGNITION ENGINE

(71) Applicant: Yechu Tu, Guangdong (CN)

(72) Inventor: Yechu Tu, Guangdong (CN)

(*) Notice: Subject to any disclaimer, the term of this patent is extended or adjusted under 35 U.S.C. 154(b) by 17 days.

(21) Appl. No.: 18/008,189

(22) PCT Filed: May 10, 2021

(86) PCT No.: PCT/CN2021/092671
§ 371 (c)(1),
(2) Date: Dec. 5, 2022

(87) PCT Pub. No.: WO2021/244227
PCT Pub. Date: Dec. 9, 2021

(65) Prior Publication Data
US 2023/0279829 A1    Sep. 7, 2023

(30) Foreign Application Priority Data

Jun. 4, 2020  (CN) .......................... 202010502578.2
Jun. 4, 2020  (CN) .......................... 202021011573.1

(51) Int. Cl.
*F02M 26/08*    (2016.01)
*F02B 37/00*    (2006.01)
(Continued)

(52) U.S. Cl.
CPC ........... *F02M 26/37* (2016.02); *F02B 37/001* (2013.01); *F02B 37/04* (2013.01); *F02B 39/10* (2013.01);
(Continued)

(58) Field of Classification Search
CPC ...... F02B 1/12; F02B 1/14; F02B 3/06; F02B 19/02; F02B 33/44; F02B 37/00;
(Continued)

(56) References Cited

U.S. PATENT DOCUMENTS

| 5,494,008 A * | 2/1996 | Ohkawa | F02D 13/0215 123/90.15 |
| 5,520,594 A * | 5/1996 | Fukasawa | B60W 30/1819 477/181 |
| 2008/0196406 A1* | 8/2008 | Kuzuyama | F02M 21/047 123/295 |

FOREIGN PATENT DOCUMENTS

CN           201925010 U      8/2011

OTHER PUBLICATIONS

International Search Report of PCT Patent Application No. PCT/CN2021/092671 issued on Jul. 9, 2021.

* cited by examiner

*Primary Examiner* — Dapinder Singh
(74) *Attorney, Agent, or Firm* — Jeenam Park

(57) ABSTRACT

A high-pressure gas compression-ignition engine includes a cylinder block, a piston and a cylinder head, the piston is mounted on the cylinder block and sealed by the cylinder head to form a combustion chamber for fuel work, and the cylinder head is respectively provided with an intake valve and an exhaust valve. It also comprises a fuel supply system, the fuel in the tank is pressurized by the pump body through a fuel channel and then supplied to the combustion chamber of the cylinder block; a fuel injection device for injecting fuel into the intake valve; a compression-ignition system, which is connected to the exhaust duct or the external air source, and recovers or sucks part of the tail gas energy discharged from the power stroke of the combustion chamber into the external air source, and stores it in the compression-ignition gas storage tank after compression.

10 Claims, 2 Drawing Sheets

(51) Int. Cl.
  *F02B 37/04*    (2006.01)
  *F02B 39/10*    (2006.01)
  *F02M 26/09*    (2016.01)
  *F02M 26/14*    (2016.01)
  *F02M 26/37*    (2016.01)

(52) U.S. Cl.
  CPC ............ *F02M 26/08* (2016.02); *F02M 26/09*
              (2016.02); *F02M 26/14* (2016.02)

(58) Field of Classification Search
  CPC ........ F02B 37/001; F02B 37/04; F02B 39/10;
        F02B 43/02; F02D 41/0002; F02M 26/08;
        F02M 26/09; F02M 26/10; F02M 26/01;
        F02M 26/05; F02M 26/14; F02M 26/37;
                      Y02T 10/12; Y02T 10/40
  See application file for complete search history.

HIGH-PRESSURE GAS COMPRESSION-IGNITION ENGINE

TECHNOLOGY FIELD

This invention is related to internal combustion engine technology, in particular to a high-pressure gas compression-ignition engine.

BACKGROUND TECHNOLOGY

At present, as internal combustion engines such as gasoline engines or diesel engines installed on vehicles such as cars or trucks, direct injection or in-cylinder injection internal combustion engines are mostly adopted, in which fuel is directly injected into the combustion chamber (cylinder) instead of the intake port. In the direct injection internal combustion engine, when an intake valve is opened, air is sucked into the combustion chamber from a corresponding intake port, and a fuel injection valve (injector) will directly inject fuel into the combustion chamber during an intake stroke or a compression stroke in which a piston rises to compress the intake air. Therefore, high-pressure air and atomized fuel are mixed with each other, and the resulting fuel-air mixture will be ignited by the spark plug to burn in the combustion chamber for work. Then when the exhaust valve is opened, the exhaust gas will be discharged through the exhaust port. In a fuel system of a direct injection internal combustion engine, an electric low-pressure fuel pump can suck fuel in a fuel tank and raises the pressure of the fuel to a predetermined low pressure, and a high-pressure fuel pump will raise the pressure of the low-pressure fuel to provide high-pressure fuel. Subsequently, the high-pressure fuel will be stored in the delivery pipeline, and a plurality of fuel injection valves (injectors) installed on the delivery pipeline will inject the fuel into the corresponding combustion chambers in the form of particles.

The existing direct injection or in-cylinder injection internal combustion engine usually compresses the air-fuel mixture through the piston, and then ignites with the aid of a spark plug to generate kinetic energy, that is, the existing engine uses a high compression ratio for ignition, and the air-fuel mixture may be successfully ignited before the compression ratio reaches the maximum. During compression, the general compression ratio is controlled between 8.5 and 9.5 due to the anti-knock performance of fuel. If the compression ratio is further increased, the burning air-fuel mixture will continue to be compressed, the cylinder might be easy to produce a burst, and then the cylinder will explode and damage the whole engine. Therefore, the engine is limited by the anti-knock performance of fuel during the compression stroke, and the compression ratio cannot be designed to be higher than the anti-knock performance of fuel, which leads to the defect of excessive kinetic energy loss of the engine when the automobile engine is designed according to the compression ratio.

On this ground, the compression ratio is a very important structural parameter of the engine, which represents the ratio of the gas volume of the piston at the beginning of compression at bottom dead center to the gas volume of the piston at the end of compression at top dead center. In terms of power and economy, the compression ratio should be as large as possible. If the compression ratio is high, the power is good and the thermal efficiency is high, so the acceleration and the maximum speed of the vehicle will be correspondingly improved. However, the compression ratio of the engine can't be too large because of the constraints of cylinder material performance and fuel combustion knock. In summary, the high-compression-ratio vehicle enjoys good power and high thermal efficiency, and the acceleration and maximum speed of the vehicle will be correspondingly improved. On the contrary, low-compression-ratio vehicle is subject to low engine compression, high fuel consumption, slow acceleration and weakness.

SUMMARY OF THE INVENTION

Aiming at the problem that the compression ratio cannot be designed to be higher than the anti-knock performance of fuel due to the restriction of the anti-knock performance of fuel during the compression stroke, the invention provides a high-pressure gas compression-ignition engine, which can effectively improve the compression ratio, thermal efficiency, power and economy by pressurizing the recovered gas to high-pressure gas for automatic compression-ignition.

The technical scheme adopted under this invention to solve its technical problems is described as follows:

A high-pressure gas compression-ignition engine, comprising a cylinder block, a piston and a cylinder head, wherein the piston is installed in the cylinder block and sealed by the cylinder head to form a combustion chamber for fuel operation, and the cylinder head is respectively provided with an intake valve linked with an intake passage and an exhaust valve linked with an exhaust passage. This engine is characterized by additional systems stated as follows:

A fuel supply system, in which fuel from the fuel tank is supplied to the combustion chamber of the cylinder block through the fuel passages and pressurized by the pump body;

A fuel injection device, which is arranged in the combustion chamber and used for injecting the fuel into the combustion chamber;

A compression-ignition system, which is connected to the exhaust duct or the external air source, can recover or suck part of the tail gas energy discharged from the power stroke of the combustion chamber into the external air source, and store it in the compression-ignition gas storage tank after high-pressure compression. The corresponding cylinder cover is provided with a compression-ignition valve assembly which communicates with the compression-ignition gas storage tank through a compression-ignition pipeline, which can inject pre-stored high-pressure gas into the combustion chamber and is used to inject fuel into the compression-ignition combustion chamber during the power stroke. The external gas source is combustible gas such as external air, oxygen, carbon dioxide, hydrogen and nitrogen.

Furthermore, the compression-ignition system comprises at least one exhaust gas turbine, a compression-ignition gas storage tank and a compression-ignition gas valve assembly, wherein the exhaust gas turbine, the compression-ignition gas storage tank and the compression-ignition gas valve assembly are sequentially connected in series through pipelines, and the exhaust gas turbine is linked with the exhaust passage of the exhaust valve on the cylinder head through pipelines. The exhaust gas turbine recovers part of the tail gas energy discharged from the power stroke of the combustion chamber or sucks it into an external air source, and then discharges it into a compression-ignition gas storage tank after turbocharging. The compression-ignition gas storage tank opens the compression-ignition gas valve assembly and provides a high-pressure air source to compress the combustible mixture in the combustion chamber when the piston starts downward from the top dead center of the cylinder block during the power stroke of the combustion chamber through a pipeline and a compression-ignition gas valve assembly.

Furthermore, the compression-ignition system comprises two exhaust gas turbines, a compression-ignition storage tank and a compression-ignition valve assembly, wherein the two exhaust gas turbines, the compression-ignition storage tank and the compression-ignition valve assembly are sequentially connected in series through pipelines, and the exhaust gas turbine on the cylinder head side is connected to the exhaust passage of the exhaust valve on the cylinder head through pipelines. The exhaust gas turbine at the side of the cylinder head recovers or sucks part of the exhaust gas energy discharged from the power stroke of the combustion chamber into an external air source, and after turbocharging, the exhaust gas turbine at the side of the cylinder head is turbocharged by the second exhaust gas turbine and then discharged into a compression-ignition gas storage tank. The compression-ignition gas storage tank opens the compression gas valve assembly and provides a high-pressure air source to compress the combustible mixture in the combustion chamber when the piston starts downward from the top dead center of the cylinder body during the power stroke of the combustion chamber through a pipeline and a compression gas valve assembly.

Furthermore, the compression gas valve assembly comprises a pre-stored air valve, a pre-stored ram cylinder and a compression-ignition air valve for pre-storing a certain amount of high-pressure gas diverted from a compression-ignition storage tank to compress the combustion chamber, the pre-stored air valve is linked with the compression-ignition storage tank through a pipeline, and the working pressure in the pre-stored ram cylinder is greater than that of the combustion chamber in the cylinder body. The pressure of the high-pressure gas stored in the compression-ignition gas storage tank is greater than the working pressure in the pre-stored ram cylinder, the compression-ignition valve is arranged in the pre-stored ram cylinder, and the pre-stored high-pressure gas is injected into the combustion chamber by opening the pre-stored ram cylinder, which is used for compression-ignition of the fuel injected into the combustion chamber in the power stroke. The high-pressure gas distributed by the compression-ignition gas storage tank to the pre-stored ram cylinder will keep the engine in an idle state, and the pre-stored ram cylinder can also continuously perform compression-ignition on the combustion chamber.

Furthermore, the compression ratio of the compression gas valve assembly to the high-pressure gas supplied by the combustion chamber is not less than 9.5. In this regard, the compression ratio of the pressurized gas valve assembly relative to the high pressure gas supplied to the combustion chamber is adjusted according to the size of the combustion chamber working chamber and the different combustion fuels to provide the maximum energy efficiency ratio.

Furthermore, the exhaust gas turbine is also connected in parallel with a mechanical supercharger and/or a motor supercharger which are used to assist the compression-ignition gas storage tank to a set value when the air pressure generated by the exhaust gas turbine is insufficient.

Furthermore, the pipeline between the exhaust gas turbine and the compression-ignition gas storage tank is further provided with a first check valve for preventing the high-pressure gas source in the compression-ignition gas storage tank from flowing back to the exhaust gas turbine outlet.

Furthermore, the pipeline between the compression-ignition gas storage tank and the compression gas valve assembly is further provided with a second one-way valve for preventing the high-pressure gas source in the compression-ignition gas storage tank from flowing backwards.

Furthermore, the pipeline between the mechanical supercharger and/or motor supercharger and the compression-ignition gas storage tank is further provided with a third one-way valve for preventing the high-pressure gas source in the compression-ignition gas storage tank from flowing back to the outlet of the mechanical supercharger and/or motor supercharger.

Furthermore, the compression-ignition system further comprises at least one pulsation reducing device, which sets the length of the pipeline channel from the outlet of the exhaust gas turbine to the compression-ignition gas storage tank so that the air source pulsation caused by the operation of the exhaust gas turbine will not be transmitted to the compression-ignition gas storage tank.

The beneficial effects of this invention include:

Compared with the current technology, the exhaust gas turbine, mechanical supercharger or motor supercharger are adopted to recover the energy discharged from the power stroke in the exhaust stroke as much as possible. The stored high-pressure gas can be injected into the power stroke in the combustion chamber through the compression-ignition gas storage tank and the compression-ignition gas valve assembly to compress the combustible mixture in the combustion chamber. That is, under the condition lower than deflagration, after the compression stroke is completed and before the power stroke, the mixed gas is compressed and burned by high-pressure gas to complete the compression combustion of the mixed gas in the power stroke and drive the piston for work. In this way, the exhaust gas with high air content is pre-stored and compressed in the pre-stored stamping cylinder of the compressed gas valve assembly, so that the engine will not be damaged due to deflagration. Since the engine is not limited by the anti-knock performance of fuel during the compression stroke, the compression ratio, thermal efficiency, power performance and economy of the engine will be effectively improved, the fuel consumption and pollutant discharge will be accordingly reduced, so that the energy saving and emission reduction can be effectively realized. In comparison with the existing reciprocating piston engine, the adoption of compression-ignition will lead to a fuel utilization rate much higher than that of the existing engine by about 40%, thus effectively improving the combustion efficiency of the engine.

Therefore, compared with the existing reciprocating piston engine, this invention adopts the replacement of the existing spark plug, as well as the mode of ram compression-ignition to ignite, and improves the thermal efficiency through high compression ratio. Under any working conditions, such as heavy load and small load, the ignition mode can be always ram compression-ignition, which will not cause engine damage due to cylinder explosion. It is suitable for the common use of gasoline and diesel of various grades, and the injection mode of mixed gas can be both EFI and direct injection.

DETAILED IMPLEMENTATION MODE

The technical solutions in the embodiments of this invention will be clearly and completely described below in conjunction with the accompanying drawings in the embodiments under this invention. Obviously, the described embodiments are only part of those under this invention, but not all of them. Based on the embodiments in this invention, all other embodiments obtained by a person of ordinary skill in the art without making creative labor shall fall within the scope of protection of this invention.

Embodiment 1

Figure 1:
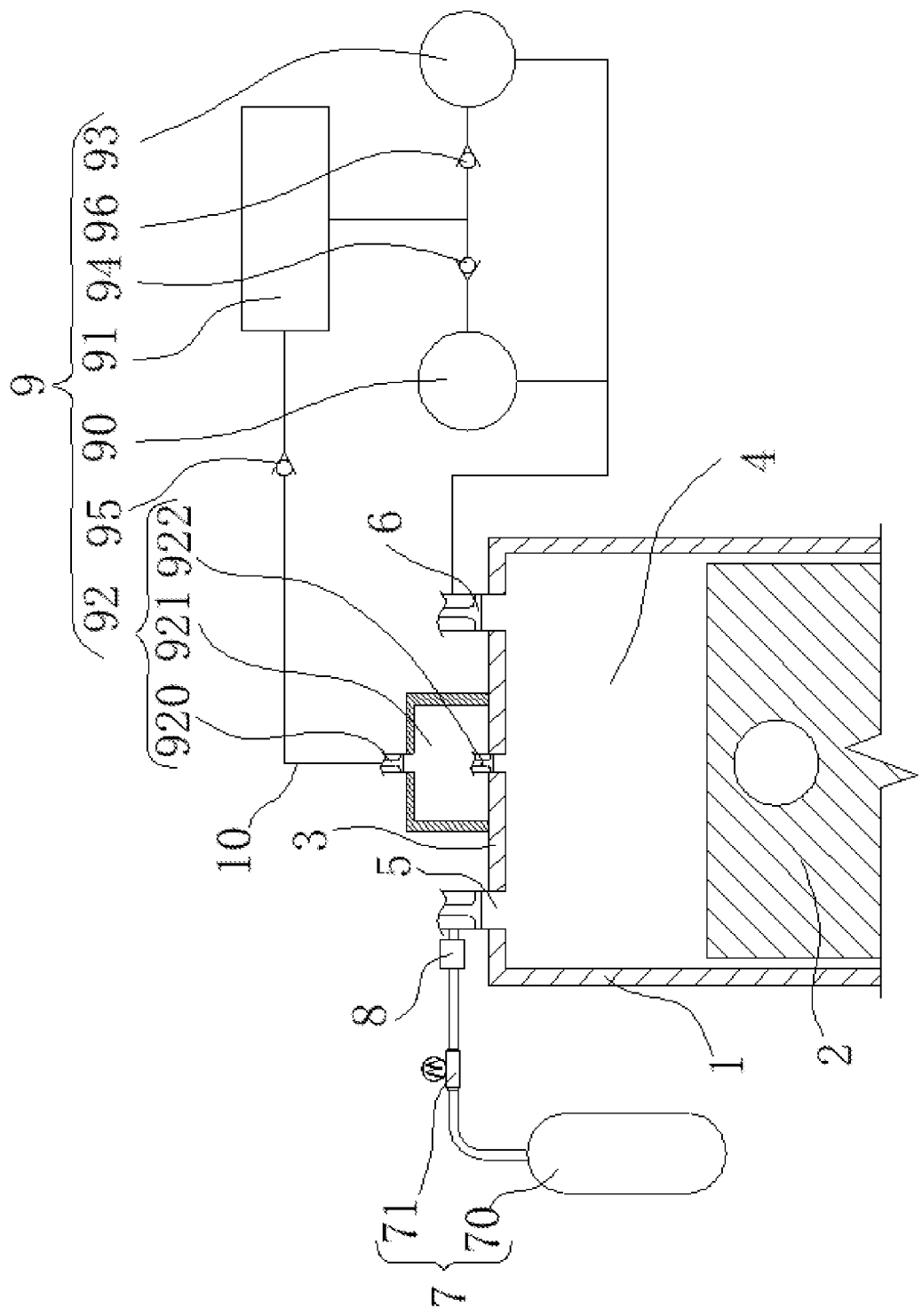
FIG. 1 is a schematic diagram of the working principle of Embodiment 1 of this invention.

A high-pressure gas compression-ignition engine, as shown in FIG. 1, includes a cylinder block 1, a piston 2 and a cylinder head 3. The piston 2 is installed in the cylinder block 1 and sealed by the cylinder head 3 to form a combustion chamber 4 for fuel operation. The compression ratio in the combustion chamber 4 is 10-25. The cylinder head 3 is respectively provided with an intake valve 5 linked with an intake passage and an exhaust valve 6 connected with an exhaust passage. The high-pressure gas compression-ignition engine also includes a fuel supply system 7, a fuel injection device 8 and a compression-ignition system 9. In the fuel supply system 7, the fuel in a fuel tank 70 is pressurized by a pump body 71 through a fuel passage and then supplied into the combustion chamber 4 of the cylinder block 1. The fuel injection device 8 is arranged on the combustion chamber 4 for injecting the fuel in the fuel tank 70 into the combustion chamber 4. The compression-ignition system 9 is connected to the exhaust duct, recovering part of the tail gas energy discharged from the power stroke of the combustion chamber 4, and storing it in the compression-ignition gas storage tank after high-pressure compression. The corresponding cylinder head 3 is provided with a compression-ignition valve assembly 92 which is connected with the compression-ignition gas storage tank through a compression-ignition pipeline 10 and can inject high-pressure gas into the combustion chamber 4 for injecting fuel into the combustion chamber 4 during the power stroke.

As shown in FIG. 1, the compression-ignition system 9 consists of an exhaust gas turbine 90, a compression-ignition air tank 91, and a compression-ignition valve assembly 92. The exhaust gas turbine 90, the compression-ignition air tank 91, and the compression-ignition valve assembly 92 are sequentially connected in series through pipelines, while the exhaust gas turbine is connected to the exhaust passage of the exhaust valve 6 on the cylinder head 3 through pipelines. The exhaust gas turbine 90 recovers part of the exhaust gas energy discharged from the power stroke of the combustion chamber 4, and after turbocharging, it is discharged into a compression-ignition gas storage tank 91. During operation, the compression-ignition gas storage tank 91 opens and provides a high-pressure gas source to compress the combustible mixture in the combustion chamber 4 when the piston 2 starts downward from the top dead center of the cylinder block 1 during the power stroke of the combustion chamber 4 through a pipeline and a compression-ignition gas valve assembly 92. Among them, due to the anti-knock performance of fuel, the cylinder compression ratio of the engine in the prior art is controlled between 8.5 and 9.5. In this invention, the compression ratio of the compressed gas valve assembly 92 relative to the high-pressure gas supplied by the combustion chamber is much higher than 9.5 due to the ignition mode of compression combustion. But in practice, the compression ratio of the pressurized gas valve assembly relative to the high pressure gas supplied to the combustion chamber needs to be adjusted according to the size of the combustion chamber working chamber and the different combustion fuels to provide the maximum energy efficiency ratio.

As shown in FIG. 1, the compression-ignition valve assembly 92 consists of a pre-stored air valve 920, a pre-stored ram cylinder 921 for pre-storing a certain amount of high-pressure gas diverted from the compression-ignition air tank 91 to compression-ignite the combustion chamber 4, and a compression-ignition ignition air valve 922. The pre-stored air valve 920 is linked with the compression-ignition air tank 91 through a pipeline, and the working pressure in the pre-stored ram cylinder 921 is greater than that of the combustion chamber 4 in the cylinder block 1. The pressure of the high-pressure gas stored in the compressed air storage tank 91 is greater than the working pressure in the pre-stored ram cylinder 921, while the compression-ignition valve 922 is arranged in the pre-stored ram cylinder 921, which can inject the pre-stored high-pressure gas into the combustion chamber 4 by opening the pre-stored ram cylinder 921, and can be used to compress the fuel injected into the combustion chamber 4 during the power stroke. Moreover, in the working process, the high-pressure gas distributed by the compression-ignition gas storage tank 91 to the pre-stored ram cylinder 921 will keep the engine in an idle state, and the pre-stored ram cylinder 921 can continuously perform compression-ignition on the combustion chamber 4.

At the same time, as shown in FIG. 1, the exhaust gas turbine 90 is also connected in parallel through a pipeline. When the air pressure generated by the exhaust gas turbine 90 is insufficient, a supercharger 93 is provided to assist the compression-ignition gas storage tank 91 to a set value. Of course, the supercharger 93 can also be replaced by a motor supercharger. A first one-way valve 94 for preventing the high-pressure gas source in the compression-ignition gas storage tank 91 from flowing back to the exhaust gas turbine 90 is arranged on the pipeline between the exhaust gas turbine 90 and the compression-ignition gas storage tank 91. A second one-way valve 95 for preventing the high-pressure gas source in the compression-ignition gas storage tank 91 from flowing backward is arranged on the pipeline between the compression-ignition storage tank 91 and the compression gas valve assembly 92. And a third one-way valve 96 for preventing the high-pressure gas source in the compression-ignition gas storage tank 91 from flowing back to the supercharger 93 is arranged on the pipeline between the supercharger 93 and the compression-ignition gas storage tank 91.

Embodiment 2

Figure 2:
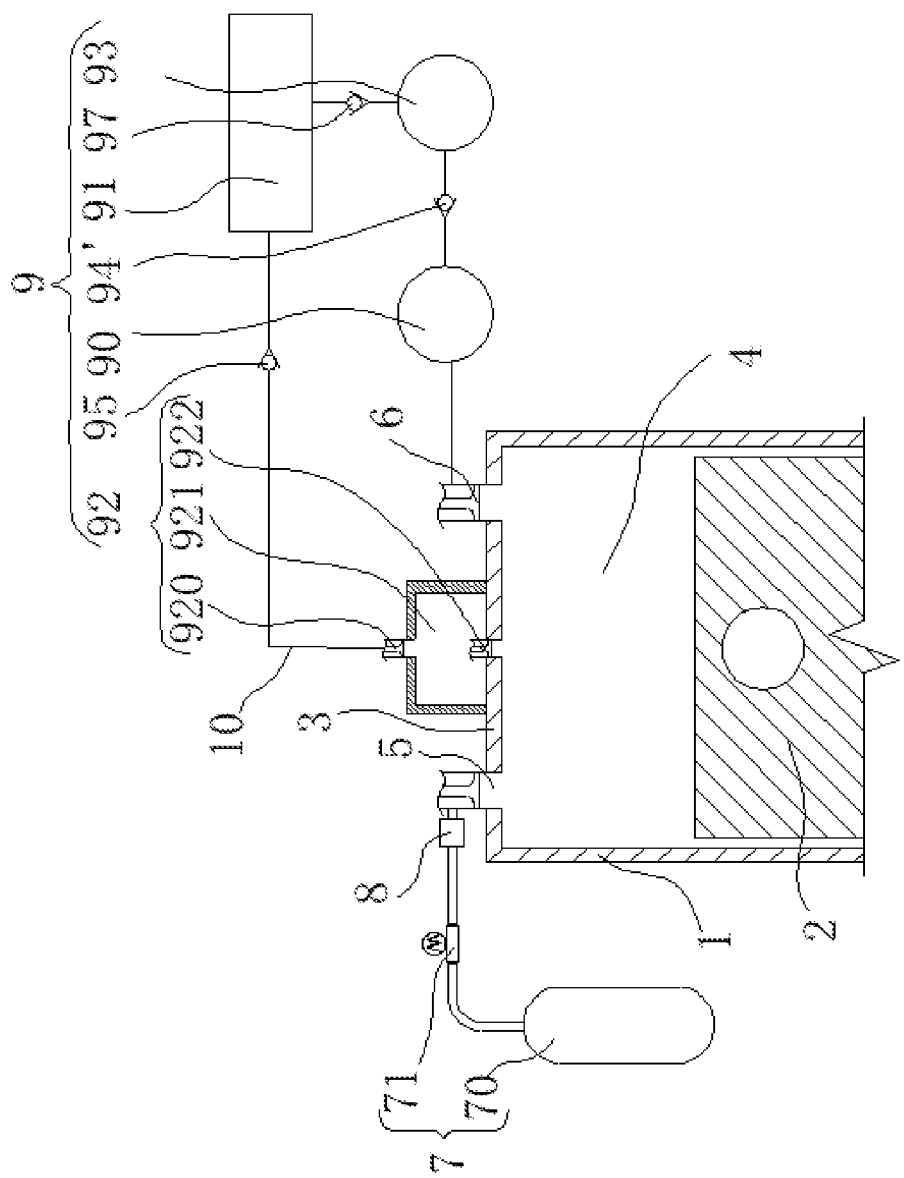
FIG. 2 is a schematic diagram of the working principle of Embodiment 2 of this invention.

As shown in FIG. 2, this embodiment differs from Embodiment 1 in that this compression-ignition system consists of two exhaust gas turbines 90, a compression-ignition storage tank 91 and a compression-ignition valve assembly 92. The two exhaust gas turbines 90, the compression-ignition storage tank 91 and the compression-ignition valve assembly 92 are sequentially connected in series through pipelines, while the exhaust gas turbine 90 on the cylinder head 3 side is connected to the exhaust passage of the exhaust valve 6 on the cylinder head 3 through pipelines. The exhaust gas turbine 90 on the third side of the cylinder head can recover part of the exhaust gas discharged from the power stroke of the combustion chamber, and after turbo-charging, it will be turbocharged by the second exhaust gas turbine 90' and then discharged into a compression-ignition gas storage tank 91. The compression-ignition gas storage tank 91 opens and provides a high-pressure gas source to compress the combustible mixture in the combustion chamber 4 when the piston starts downward from the top dead center of the cylinder block 1 during the power stroke of the combustion chamber. At the same time, a first check valve 94' for preventing the high-pressure air source from flowing backwards is arranged on the pipeline of the outlet of the exhaust gas turbine 90 on the cylinder head 3 side. And a fourth check valve 97 for preventing the second exhaust gas turbine 90' from flowing backwards is also arranged on the pipeline between the two exhaust gas turbines.

In addition, in the above two embodiments, the compression-ignition system also includes at least one pulsation reducing device (not shown in the figure), which sets the length of the pipeline channel from the outlet of the exhaust gas turbine to the compression-ignition storage tank so that the air source pulsation caused by the operation of the exhaust gas turbine will not be transmitted to the compression-ignition storage tank. Of course, the pulsation reducing device can also be a throttle (not shown in the figure) arranged in the pipeline channel from the outlet of the exhaust gas turbine to the compression-ignition gas storage tank to reduce the area of the pipeline channel.

When in use, the engine runs in four strokes: suction, compression, work and exhaust. When the piston 2 moves downward from the top dead center of the cylinder block 1, the compression gas valve assembly 92 between the compression gas storage tank 91 and the engine cylinder opens, and the high-pressure gas source enters the engine cylinder block 1 and compresses the combustible mixture in the combustion chamber 4. When the mixture burns, it gives off a lot of heat, which makes the pressure in the combustion chamber 4 of the cylinder block 1 suddenly increase and pushes the piston 2 to move downward. Finally, the exhaust stroke will exhaust the waste gas generated after the combustion of combustible mixture, completing the whole cycle.

In comparison with the existing reciprocating piston engine, this invention replaces the existing spark plug, ignites by ram compression-ignition, and improves the thermal efficiency by high compression ratio. Under any working condition, such as heavy load and small load, the ignition mode will be ram compression-ignition all the time, and the engine will not be damaged due to cylinder explosion. It is suitable for the sharing of gasoline and diesel of various grades, and the injection mode of mixed gas can be both EFI and direct injection, which is widely applicable, safe and stable, with long service life and high efficiency, which is more fuel-efficient and will cut down the cost of utilization.

The above-mentioned embodiments are only preferred embodiments of this invention, and are not intended to limit the scope of implementation of this invention. All equivalent changes according to the shape, structure and principle of this invention should be covered within the scope of protection of this invention.

What is claimed is:

1. A high-pressure gas compression-ignition engine, comprising a cylinder block, a piston and a cylinder head, wherein the piston is installed in the cylinder block and sealed by the cylinder head to form a combustion chamber for fuel operation, and the cylinder head is respectively provided with an intake valve linked with an intake passage and an exhaust valve linked with an exhaust passage, wherein the engine further comprises:
   a fuel supply system, in which fuel from a fuel tank is supplied to the combustion chamber of the cylinder block through fuel passages and pressurized by a pump body;
   a fuel injection device, which is arranged in the combustion chamber and used for injecting the fuel into the combustion chamber;
   a compression-ignition system, which is connected to an exhaust duct or an external air source, can recover or suck a part of a tail gas energy discharged from a power stroke of the combustion chamber into the external air source, and store it in a compression-ignition gas storage tank after high-pressure compression, a corresponding cylinder cover is provided with a compression-ignition gas valve assembly which communicates with the compression-ignition gas storage tank through a compression-ignition pipeline, which can inject pre-stored high-pressure gas into the combustion chamber and is used to inject fuel into the combustion chamber during the power stroke.

2. The high-pressure gas compression-ignition engine according to claim 1, wherein: the compression-ignition system comprises at least one exhaust gas turbine, the compression-ignition gas storage tank and the compression-ignition gas valve assembly, wherein the exhaust gas turbine, the compression-ignition gas storage tank and the compression-ignition gas valve assembly are sequentially connected in series through pipelines, and the exhaust gas turbine is linked with the exhaust passage of the exhaust valve on the cylinder head through pipelines, the exhaust gas turbine recovers the part of the tail gas energy discharged from the power stroke of the combustion chamber or sucks it into the external air source, and then discharges it into the compression-ignition gas storage tank after turbocharging, the compression-ignition gas storage tank opens the compression-ignition gas valve assembly and provides a high-pressure air source to compress a combustible mixture in the combustion chamber when the piston starts downward from a top dead center of the cylinder block during the power stroke of the combustion chamber through a pipeline and a compression-ignition gas valve assembly.

3. The high-pressure gas compression-ignition engine according to claim 2, wherein: the exhaust gas turbine is also connected in parallel with a mechanical supercharger and/or a motor supercharger which are used to assist the compression-ignition gas storage tank to a set value when an air pressure generated by the exhaust gas turbine is insufficient.

4. The high-pressure gas compression-ignition engine according to claim 3, wherein: the pipeline between the mechanical supercharger and/or motor supercharger and the compression-ignition gas storage tank is further provided with a third one-way valve for preventing a high-pressure gas source in the compression-ignition gas storage tank from flowing back to an outlet of the mechanical supercharger and/or motor supercharger.

5. The high-pressure gas compression-ignition engine according to claim 2, wherein: the pipeline between the exhaust gas turbine and the compression-ignition gas storage tank is further provided with a first check valve for preventing a high-pressure gas source in the compression-ignition gas storage tank from flowing back to an outlet of the exhaust gas turbine.

6. The high-pressure gas compression-ignition engine according to claim 2, wherein: the compression-ignition system further comprises at least one pulsation reducing device, which sets a length of a pipeline channel from an outlet of the exhaust gas turbine to the compression-ignition gas storage tank so that an air source pulsation caused by an operation of the exhaust gas turbine will not be transmitted to the compression-ignition gas storage tank.

7. The high-pressure gas compression-ignition engine according to claim 1, wherein: the compression-ignition system comprises two exhaust gas turbines including a first exhaust gas turbine and a second exhaust gas turbine, the compression-ignition gas storage tank and the compression-ignition gas valve assembly, wherein the two exhaust gas turbines, the compression-ignition gas storage tank and the compression-ignition gas valve assembly are sequentially connected in series through pipelines, and the first exhaust gas turbine is on a cylinder head side and is connected to the exhaust passage of the exhaust valve on the cylinder head through pipelines, the first exhaust gas turbine recovers or sucks the part of the tail gas energy discharged from the power stroke of the combustion chamber into the external air source, and after turbocharging, an exhaust gas from the first exhaust gas turbine is further turbocharged by the second exhaust gas turbine and then discharged into the compression-ignition gas storage tank, the compression-ignition gas storage tank opens the compression-ignition gas valve assembly and provides a high-pressure air source to compress a combustible mixture in the combustion chamber when the piston starts downward from a top dead center of a cylinder body during the power stroke of the combustion chamber through a pipeline and the compression-ignition gas valve assembly.

8. The high-pressure gas compression-ignition engine according to claim 1, wherein: the compression-ignition gas valve assembly comprises a pre-stored air valve, a pre-stored ram cylinder and a compression-ignition air valve for pre-storing a certain amount of high-pressure gas diverted from the compression-ignition gas storage tank to compress the combustion chamber, the pre-stored air valve is linked with the compression-ignition gas storage tank through a pipeline, and a working pressure in the pre-stored ram cylinder is greater than that of the combustion chamber in a cylinder body, a pressure of the high-pressure gas stored in the compression-ignition gas storage tank is greater than the working pressure in the pre-stored ram cylinder, the compression-ignition air valve is arranged in the pre-stored ram cylinder, and the pre-stored high-pressure gas is injected into the combustion chamber by opening the pre-stored ram cylinder, which is used for compression-ignition of the fuel injected into the combustion chamber in the power stroke, the high-pressure gas distributed by the compression-ignition gas storage tank to the pre-stored ram cylinder will keep the engine in an idle state, and the pre-stored ram cylinder can also continuously perform compression-ignition on the combustion chamber.

9. The high-pressure gas compression-ignition engine according to claim 1, wherein: a compression ratio of the compression gas valve assembly to the high-pressure gas supplied by the combustion chamber is not less than 9.5.

10. The high-pressure gas compression-ignition engine according to claim 1, wherein: the pipeline between the compression-ignition gas storage tank and the compression-ignition gas valve assembly is further provided with a second one-way valve for preventing a high-pressure gas source in the compression-ignition gas storage tank from flowing backwards.

* * * * *